(12) United States Patent
Chou

(10) Patent No.: US 9,071,095 B2
(45) Date of Patent: Jun. 30, 2015

(54) HIGH PERFORMANCE POWER GENERATION APPARATUS

(76) Inventor: Chung-Ming Chou, Tainan (TW)

( * ) Notice: Subject to any disclaimer, the term of this patent is extended or adjusted under 35 U.S.C. 154(b) by 626 days.

(21) Appl. No.: 13/397,006

(22) Filed: Feb. 15, 2012

(65) Prior Publication Data

US 2012/0212084 A1 Aug. 23, 2012

(30) Foreign Application Priority Data

Feb. 17, 2011 (TW) .............................. 100105194 A

(51) Int. Cl.
*H02K 23/60* (2006.01)
*H02K 7/18* (2006.01)
*H02K 7/116* (2006.01)

(52) U.S. Cl.
CPC .............. *H02K 7/1807* (2013.01); *H02K 7/116* (2013.01)

(58) Field of Classification Search
USPC ................... 310/54, 99, 112–120; 290/44, 55
See application file for complete search history.

(56) References Cited

U.S. PATENT DOCUMENTS

| 5,062,823 | A * | 11/1991 | Ra et al. ......................... 475/330 |
| 6,252,317 | B1 * | 6/2001 | Scheffer et al. .................. 310/46 |
| 6,288,463 | B1 * | 9/2001 | Tada et al. .................... 310/75 B |
| 6,548,913 | B2 * | 4/2003 | Jang ................................ 290/55 |
| 6,608,397 | B2 * | 8/2003 | Makino et al. .................. 290/44 |
| 7,215,037 | B2 * | 5/2007 | Scalzi ............................... 290/55 |
| 7,569,963 | B2 * | 8/2009 | Caiozza ........................ 310/171 |
| 7,964,978 | B1 * | 6/2011 | Weissmann ..................... 290/44 |
| 8,022,564 | B2 * | 9/2011 | Nohara et al. .................. 290/44 |
| 2006/0091732 | A1 * | 5/2006 | Onishi ............................ 310/12 |
| 2009/0243297 | A1 * | 10/2009 | Nohara et al. .................. 290/44 |

FOREIGN PATENT DOCUMENTS

| TW | 200409438 | 6/2004 |
| TW | M326582 | 2/2008 |
| TW | 201025796 | 7/2010 |
| TW | 201027884 | 7/2010 |

* cited by examiner

*Primary Examiner* — Naishadh Desai
(74) *Attorney, Agent, or Firm* — Muncy, Geissler, Olds & Lowe, P.C.

(57) ABSTRACT

A high performance power generation apparatus includes a first rotary member and a second rotary member. The first rotary member has a spindle and a rotor fastened to the spindle. The spindle has a first gear coupled thereon. The rotor has a first electromagnetic portion. The second rotary member has an internal gear ring and a second electromagnetic portion. The first gear and internal gear ring are interposed by at least one transmission gear. When the spindle drives the rotor and first gear to spin, the first gear drives the second rotary member to spin in the direction opposite to the first rotary member via the transmission gear so that the induction coil and magnet can interact at greater relative spinning speed to generate a greater amount of electric power output.

7 Claims, 3 Drawing Sheets

HIGH PERFORMANCE POWER GENERATION APPARATUS

FIELD OF THE INVENTION

The present invention relates to a power generation apparatus and particularly to a power generation apparatus that has a stator and a rotor spinning against each other.

BACKGROUND OF THE INVENTION

Electric power has greatly improved the life of human being ever since its discovery and made huge progress of material civilization possible. Nowadays people rely heavily on the electric power in every aspect of life, and the demand of electric power is enormous. Mankind has constantly endeavored all kinds energy exploitation and development to get electric power. The most commonly adopted power generation approach at present is through power generators.

A power generator mainly comprises a stator and a rotor, and corresponding coils and magnets located respectively on the stator and rotor. When the rotor spins against the stator, according to the induction effect discovered by British physicist Faraday, the stator and rotor provide cutting of the magnetic lines to generate current.

R.O.C. patent No. M326582 discloses a direct-driven external rotor power generator which comprises a shaft, a rotor casing, a plurality of permanent magnets, a stator support casing, a stator coil and a rotor back iron ring. The shaft drives the rotor to spin. The magnets spin against the coil, and the coil is induced to generate alternating current.

The aforesaid technique adopts a traditional power generation structure, i.e., the stator is stationary, and the rotor spins to cut the magnetic lines of the coil and magnets to generate electric current. Such a structure has a disadvantage, namely the amount of power generation fully depends on the spinning speed input by the rotor. To get more power output more power is required to drive the rotor to spin at faster speeds. To remedy this drawback, a technique able to maintain substantial output power under a limited rotor spinning speed has been developed. It provides a stator spinning against the rotor.

R.O.C. publication No. 200409438 discloses a high efficiency power generator which includes a rotor and a stator. The rotor is held in the stator. The rotor and stator are driven respectively by its own power driving mechanism to spin independently about the same spindle but in opposite directions.

R.O.C. publication No. 201027884 also discloses a power generator which includes a coil portion and a magnetic portion that spin against each other in opposite directions.

The two prior arts mentioned above have the rotor and stator (i.e. coil and magnetic portion) that spin independently to increase the relative spinning speed and power generation amount. But the driving mechanism is formed by vanes that makes the power generator too bulky.

R.O.C. publication No. 201025796 discloses a power generation apparatus with improved power generation efficiency which has a power output device and a power generator set. The power generator set includes a differential gear set, a magnetic rotor and an armature rotor. The magnetic rotor has magnets on the surface. The armature rotor has armatures corresponding to the magnets. Through the differential gear set the magnetic rotor and armature rotor spin against each other in opposite directions.

The aforesaid technique makes the armature rotor and magnetic rotor spinning against each other in the opposite directions via the differential gear set to get greater amount of current. It adopts a bevel gear as the driving mechanism that takes a lot of space and also requires more elements. As a result, the structure is more complex, and repairs and maintenance also are more difficult.

SUMMARY OF THE INVENTION

The primary object of the present invention is to solve the problems of the aforesaid conventional techniques that have inadequate power generation amount caused by slow spinning speed and bulky size, or higher costs resulted from higher quality requirements of mechanical elements in order to increase the spinning speed.

To achieve the foregoing object, the present invention provides a high performance power generation apparatus that includes a first rotary member and a second rotary member. The first rotary member has a spindle and a rotor fastened to the spindle. The spindle and rotor have respectively a first gear and a first electromagnetic portion. The spindle can drive the rotor and first gear to generate a first spinning displacement. The second rotary member has a first housing chamber to house the first rotary member, an internal gear ring and a second electromagnetic portion corresponding to the first electromagnetic portion.

The first rotary member and second rotary member are interposed by at least one transmission gear. The transmission gear is engaged with the first gear and internal gear ring, and is driven by the first gear during the first spinning displacement to drive the internal gear ring so that the internal gear ring drives the second rotary member to generate a second spinning displacement in a direction opposite to the first spinning displacement. As a result, the first electromagnetic portion and second electromagnetic portion spin in the opposite directions to increase the relative spinning speed to enhance electric power conversion and output.

In one embodiment the first and second electromagnetic portions can be an induction coil and magnets that correspond to each other and can be selectively switched. The second rotary member is held in a housing and includes a plurality of bearings to support spinning thereof in the housing, and also is coupled with a lid at each of two ends thereof. One lid has at least one pin to hold the transmission gear. Another lid has an electricity conduction device. Moreover, the second rotary member has fluid guiding channels formed on the surface, and the housing has a plurality of corresponding fluid vents. Hence when the second rotary member is in the second spinning displacement, the cooling fluid can be guided into the fluid guiding channels via the fluid vents to form cooling flow to achieve desired cooling convection.

By means of the technical features set forth above, the invention can enhance power output without increasing the rotor spinning speed. Compared with the conventional techniques, the invention requires fewer elements to shrink the size of the power generation apparatus, thus the cost is lower.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
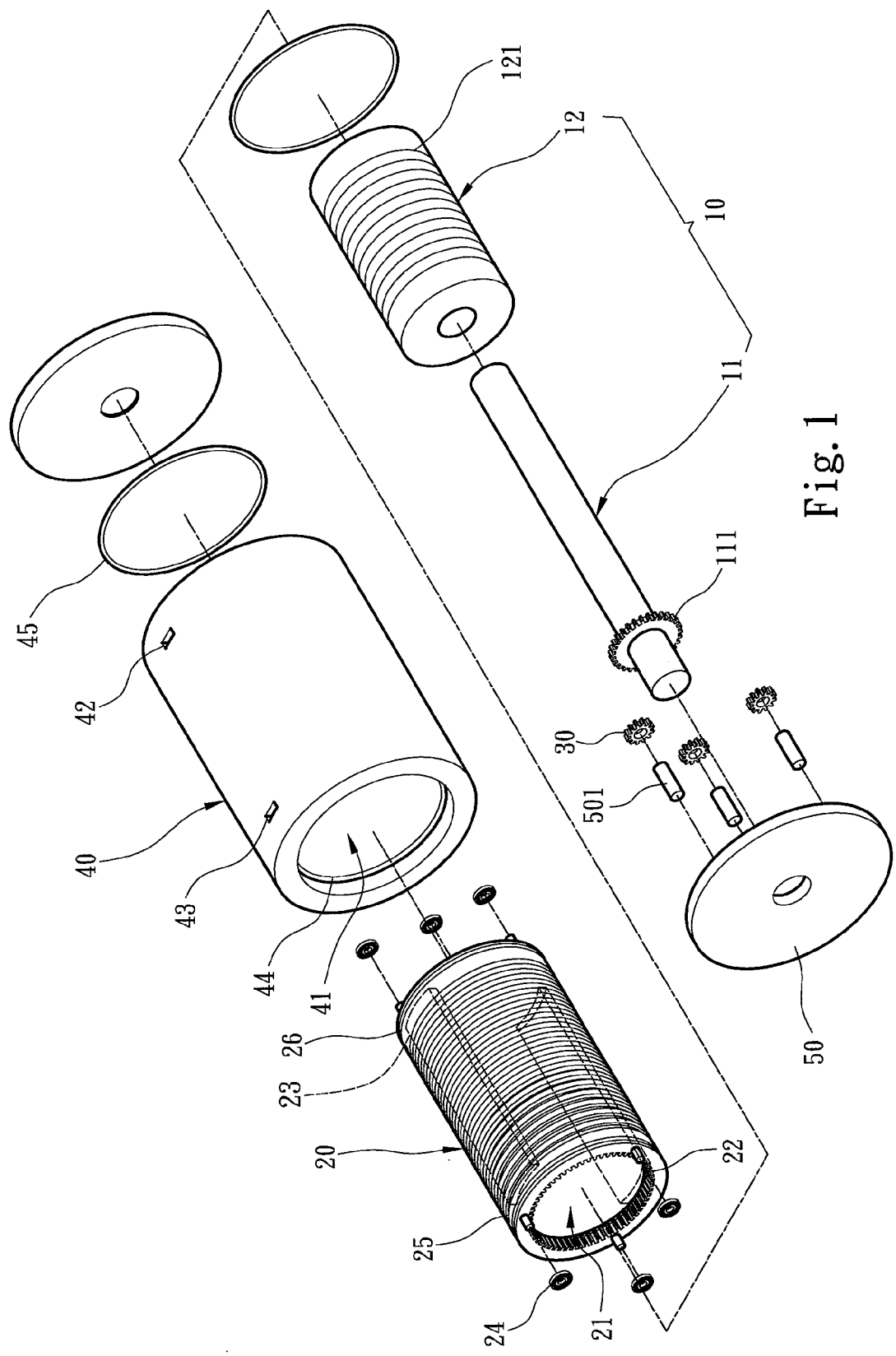
FIG. 1 is an exploded view of the invention.

Please refer to FIG. 1, the present invention aims to provide a high performance power generation apparatus which comprises a first rotary member 10, a second rotary member 20 and a housing 40. The second rotary member 20 has a first housing chamber 21 to hold the first rotary member 10. The housing 40 has a second housing chamber 41 to hold the secondary rotary member 20 and a lid 50 to couple on each of two ends thereof. The lid 50 has at least one pin 501. The first rotary member 10 and second rotary member 20 can be held inside the housing 40 through the two lids 50. The second rotary member 20 and housing 40 have respectively at least one first holding groove 26 and at least one second holding groove 44 corresponding to each other to hold an airtight ring 45. The secondary rotary member 20 further has a plurality of bearings 24 located on the perimeter to provide spinning support of the second rotary member 20 in the housing 40.

The first rotary member 10 has a spindle 11 and a rotor 12 fastened to the spindle 11. The spindle 11 has a first gear 111 coupled thereon. The rotor 12 has a first electromagnetic portion 121. The second rotary member 20 has an internal gear ring 22 and a second electromagnetic portion 23 corresponding to the first electromagnetic portion 121. In this embodiment the first electromagnetic portion 121 is an induction coil, and the second electromagnetic portion 23 is a magnet, but they are not the limitation of the invention, and can be selectively switched according to design requirements. The first gear 111 and internal gear ring 22 further are interposed by at least one transmission gear 30 which is rotatably mounted onto the pin 501 to engage with the first gear 111 and internal gear ring 22. In this embodiment the transmission gear 30 includes three sets evenly spaced from each other at a same angle of 120 degrees. The number and angular positioning of the transmission gear 30 previously discussed merely serve as an example, but not the limitation of the invention. Thus forms the main structure of the invention.

Figure 2:
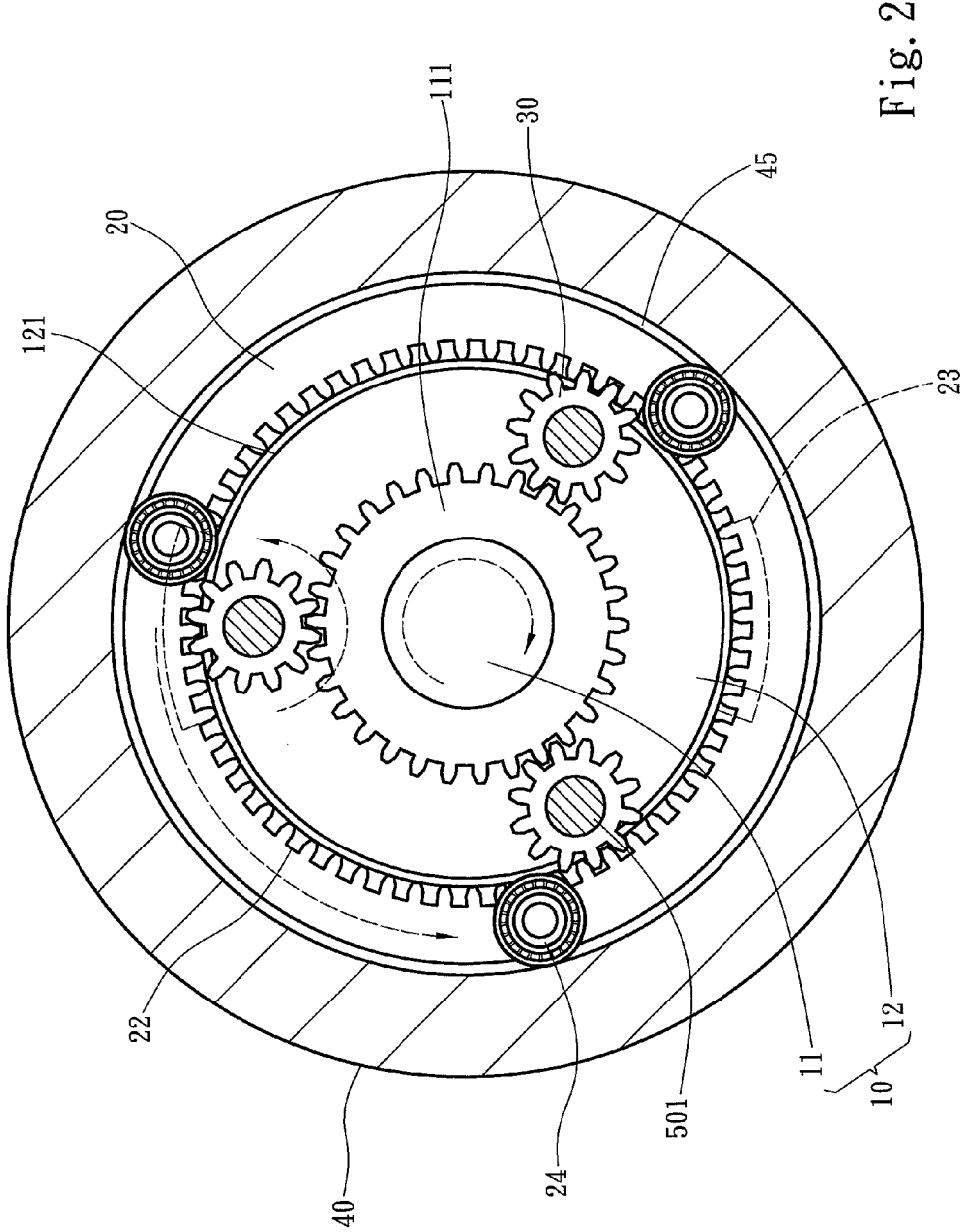
FIG. 2 is a cross section of the invention.

Please refer to FIG. 2, the first rotary member 10 and second rotary member 20 spin against each other that results in alterations of magnetic field to generate electric power. As shown in the drawings, the spindle 11 can be driven by an internal combustion engine (such as a diesel engine or a gasoline engine), a steam engine, wind power or hydraulic power or the like. The spindle 11 drives the rotor 12 and first gear 111 to generate a first spinning displacement (in the clockwise direction as shown in the drawing). In the first spinning displacement the first gear 111 drives the transmission gear 30 spinning in the opposite direction (in the counterclockwise direction as shown in the drawing). Through the transmission gear 30 the internal gear ring 22 of the second rotary member 20 is driven so that the second rotary member 20 generates a second spinning displacement (in the counterclockwise direction as shown in the drawing) opposite to the first spinning displacement. As a result, the first electromagnetic portion 121 of the first rotary member 10 and second electromagnetic portion 23 of the second rotary member 20 interact with each other to generate electromagnetic effect, and the first electromagnetic portion 121 generates current in the magnetic field of the second electromagnetic portion 23 because of their relative motion. In the condition of unchanged spinning speed of the first rotary member 10, the second rotary member 20 can get more electric power output because of spinning against the first rotary member 10. The relative speed is faster when the teeth number of the first gear 111 approximates closer to the internal gear ring 22, and the corresponding output power also is greater.

Figure 3:
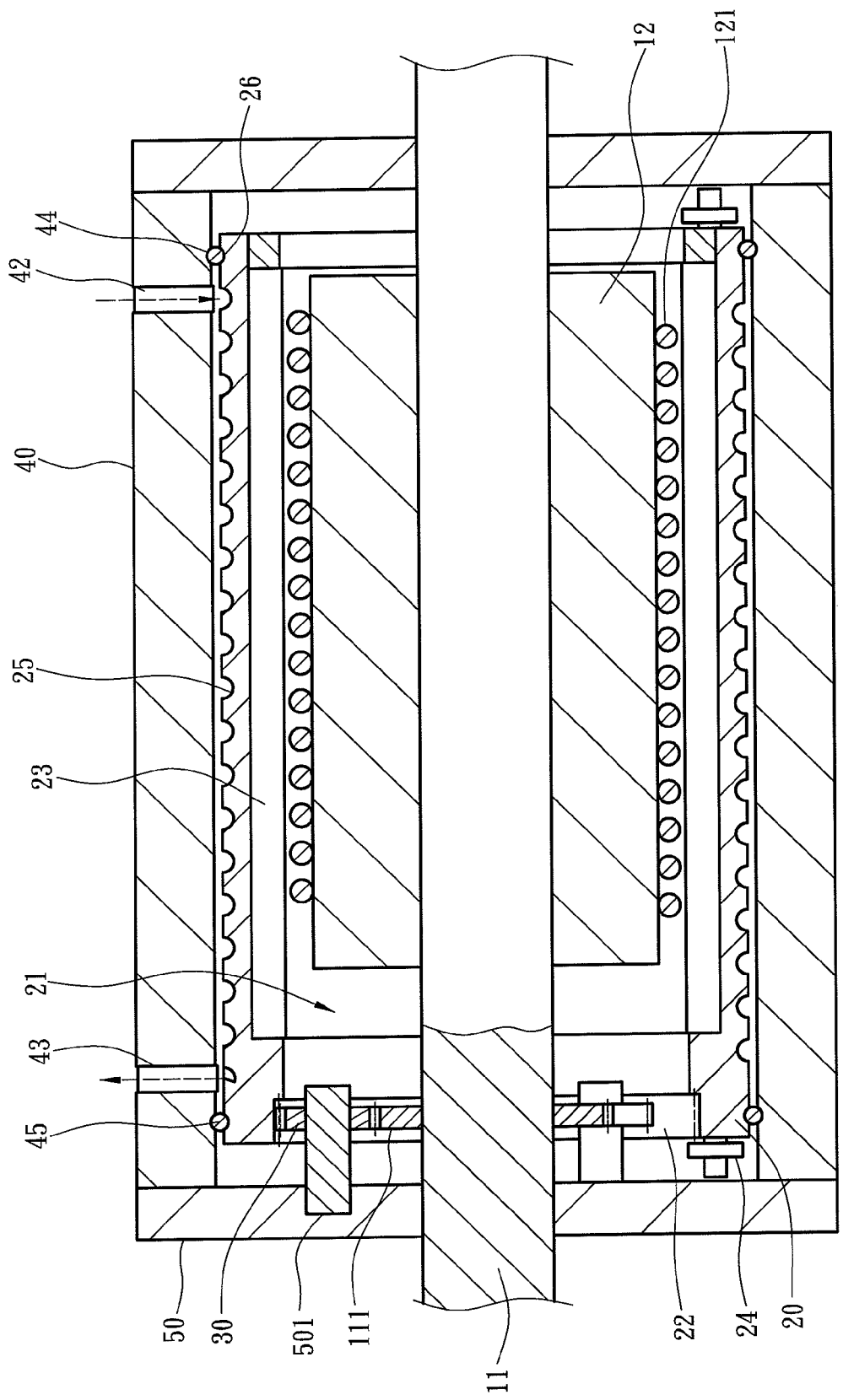
FIG. 3 is another cross section of the invention in another direction.

Also referring to FIG. 3, the second rotary member 20 has fluid guiding channels 25 formed thereon. In this embodiment, the fluid guiding channels 25 are formed in a helical manner to surround the surface of the second rotary member 20. The housing 40 has at least one fluid inlet 42 and at least one fluid outlet 43 communicating with the fluid guiding channels 25. When the second rotary member 20 is driven by the first rotary member 10 and transmission gear 30 to generate the second spinning displacement, the fluid guiding channels 25 also spin and external cooling fluid enters the fluid guiding channels 25 via the fluid inlet 42 and discharges via the fluid outlet 43 so that a cooling flow is generated in the fluid guiding channels 25 to provide desired cooling effect for the second rotary member 20. The cooling fluid can be cooling gas, cooling oil or other cooling liquids. The fluid inlet 42 and fluid outlet 43 further may include a filter inside to filter out impurities.

As a conclusion, the invention, by providing the first gear 111 on the first rotary member 10 and internal gear ring 22 on the second rotary member 22, and the transmission gear 30 between the first gear 111 and internal gear ring 22, can make the second rotary member 20 spinning against the first rotary member 10 in the opposite direction, thereby increase the relative spinning speed between them and enhance power generation. Due to the transmission gear 30 is located between the first and second rotary members 10 and 20 to change spinning direction, space can be saved, and also can be immediately adopted on existing power generators to realize economic benefit and improve practicality.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A high performance power generation apparatus, comprising:
    a first rotary member which includes a spindle, a rotor fastened to the spindle, a first gear located on the spindle and a first electromagnetic portion located on the rotor and generates a first spinning displacement;
    a second rotary member which includes a first housing chamber to hold the first rotary member, an internal gear ring and a second electromagnetic portion corresponding to the first electromagnetic portion;
    a housing which is hollow and includes a second housing chamber to hold the second rotary member, wherein the second rotary member includes a plurality of bearings contacted with an inner wall of the housing for supporting the second rotary member to rotate around the housing; and
    at least one transmission gear which is located between the first rotary member and the second rotary member to engage with the first gear and the internal gear ring and drive the second rotary member during the first spinning displacement to generate a second spinning displacement in a direction opposite to the first spinning displacement so that the first electromagnetic portion and the second electromagnetic portion move against each other to generate electric power.

2. The high performance power generation apparatus of claim 1, wherein the first electromagnetic portion is an induction coil and the second electromagnetic portion is a magnet.

3. The high performance power generation apparatus of claim 1, wherein the first electromagnetic portion is a magnet and the second electromagnetic portion is an induction coil.

4. The high performance power generation apparatus of claim 1, wherein the housing includes at least one fluid inlet and at least one fluid outlet.

5. The high performance power generation apparatus of claim 4, wherein the second rotary member includes a plurality of fluid guiding channel on the surface to receive cooling fluid via the fluid inlet during the second spinning displacement and discharge the cooling fluid through the fluid outlet to perform heat dissipation.

6. The high performance power generation apparatus of claim 1, wherein the second rotary member and the housing include respectively at least one first holding groove and at least one second holding groove, the first holding groove and the second holding groove being interposed by an airtight ring.

7. The high performance power generation apparatus of claim 1, wherein the housing is coupled with two opposing lids each including at least one pin to hold the transmission gear for spinning thereon.

\* \* \* \* \*